United States Patent [19]

Munoz

[11] Patent Number: 4,616,468
[45] Date of Patent: Oct. 14, 1986

[54] HARVESTING/PACKING SYSTEM

[76] Inventor: Miguel A. Munoz, 248 E. Gillett Rd., El Centro, Calif. 92243

[21] Appl. No.: 618,338

[22] Filed: Jun. 7, 1984

[51] Int. Cl.$^4$ .................. A01D 67/00; B65B 67/00
[52] U.S. Cl. ................................. 53/391; 56/327 R
[58] Field of Search ............... 53/390, 391; 56/16.6, 56/228, 327 R, 328 R; 414/501, 508

[56] References Cited

U.S. PATENT DOCUMENTS

| | | | |
|---|---|---|---|
| 2,321,387 | 6/1943 | Jackson | 53/515 |
| 2,590,965 | 4/1952 | Huston | 414/508 |
| 2,825,573 | 3/1958 | Shaw et al. | 414/508 |
| 3,279,158 | 10/1966 | Kirkpatrick et al. | 56/228 |
| 4,292,784 | 10/1981 | Abatti et al. | 53/391 |

Primary Examiner—James F. Coan
Attorney, Agent, or Firm—Albert L. Gabriel

[57] ABSTRACT

A moveable on-site harvesting/packing plant is built on a framework comprising a floor area and table area elevated above and extending transversely over rows of crop to be harvested such that the table area is to the rear of the moveable plant as it is towed along the crop rows. Pickers follow the moveable plant as it is towed and place harvested produce onto the table area. Extending transversely outboard from either end of the table area are inclined transverse wings, upon which harvested produce is placed and rolls onto the table area. Outboard of the table area on platforms are box assemblers who assemble boxes from stacks of flat cartons, sliding the assembled boxes along an overhead box rack toward the center of the packing table. In front of the packing table, standing on the floor area, are packers who take the empty, assembled boxes from the overhead box rack and place them into box supports which hang from the front of the packing table. The packers then fill the empty boxes with produce from the packing table, and then place the filled boxes onto a gravity feed conveyor which conducts them to a station where the filled boxes are sealed and moved onto an off-loading roller belt which gravity feeds the boxes to ground level. The moveable plant may be packed up and folded and then towed transversely to the direction of harvesting travel between harvest sites.

26 Claims, 8 Drawing Figures

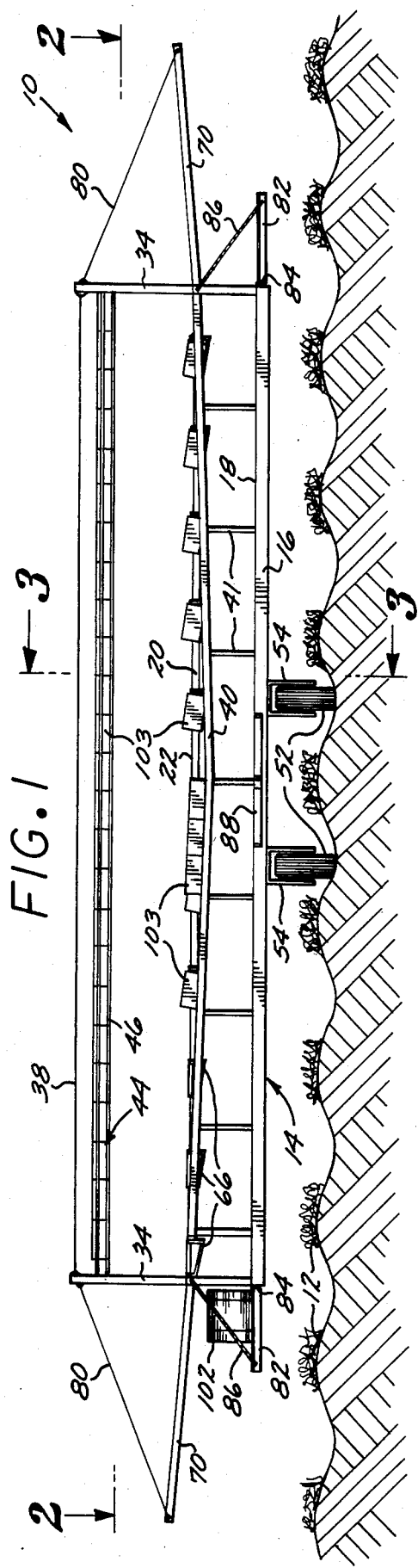
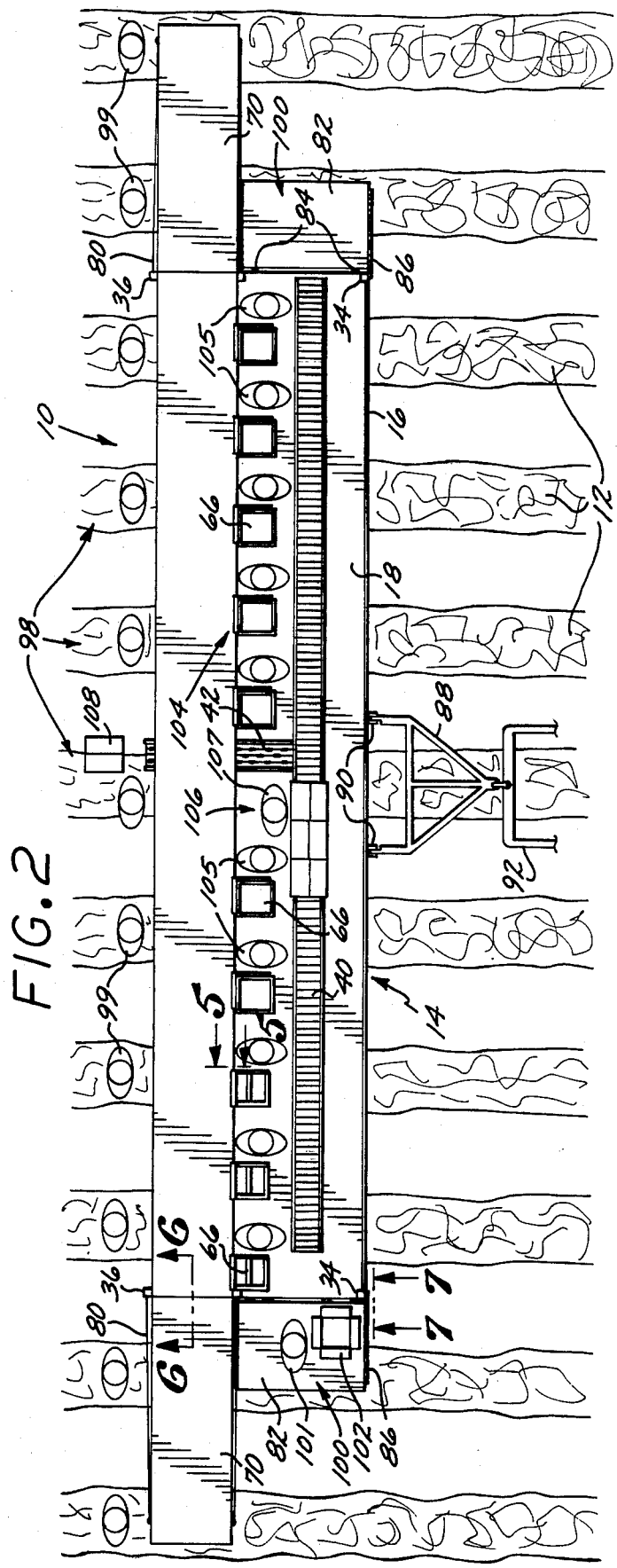

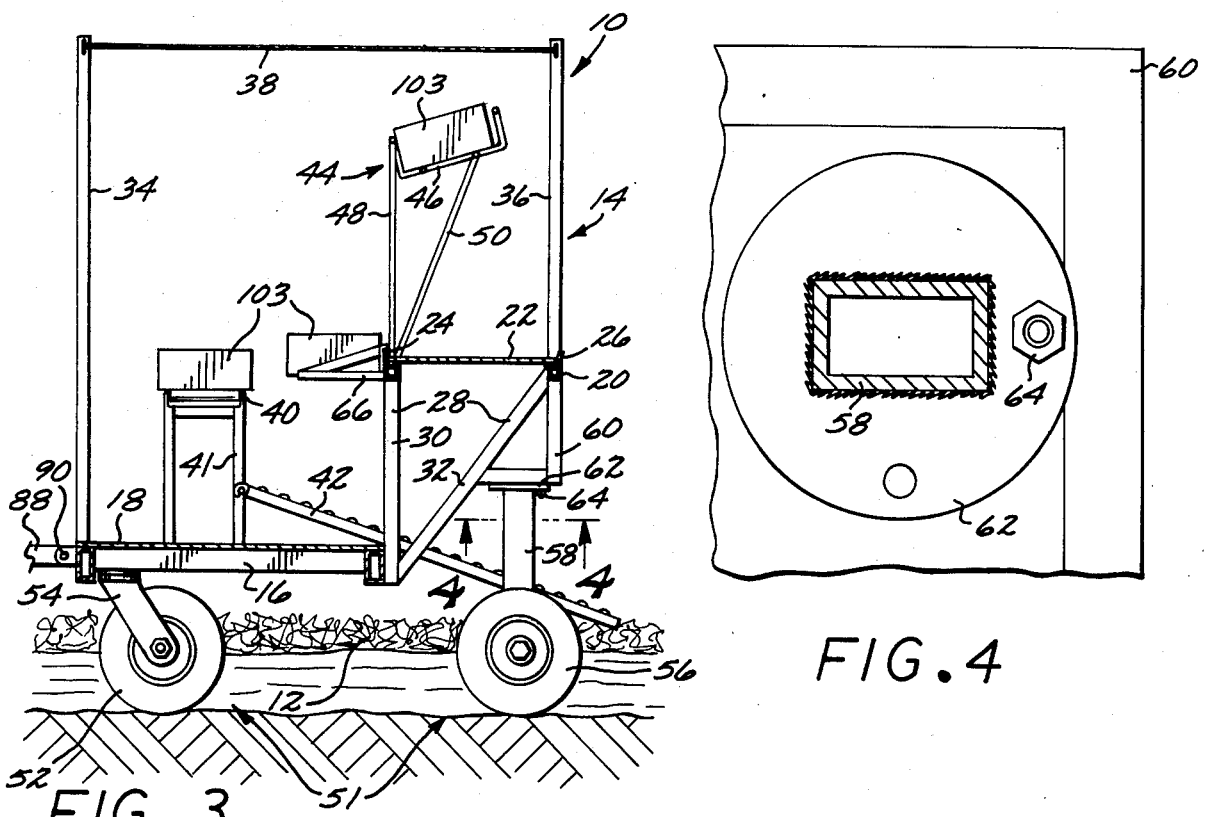
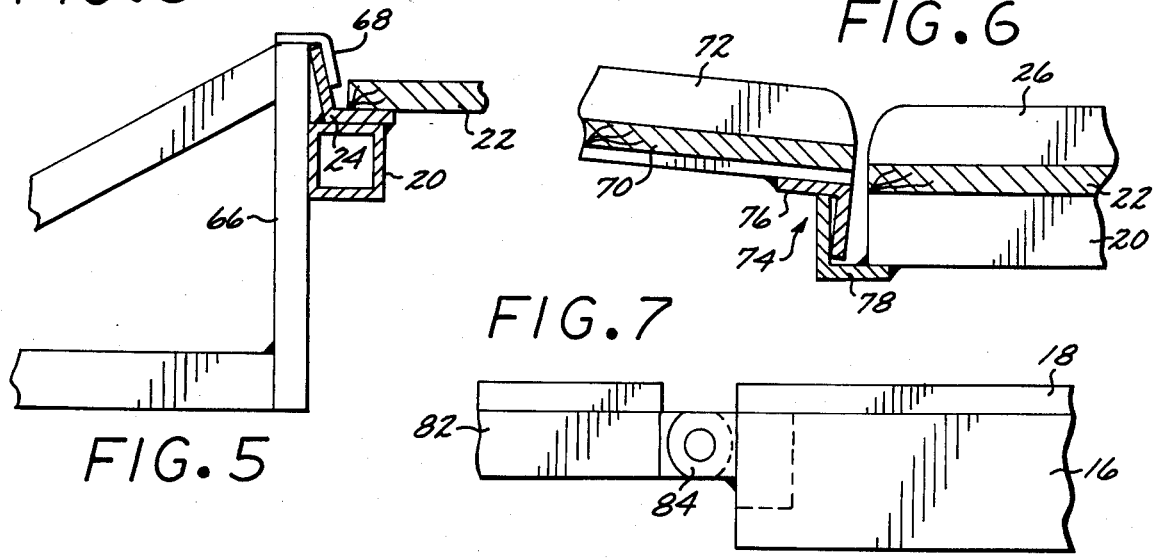
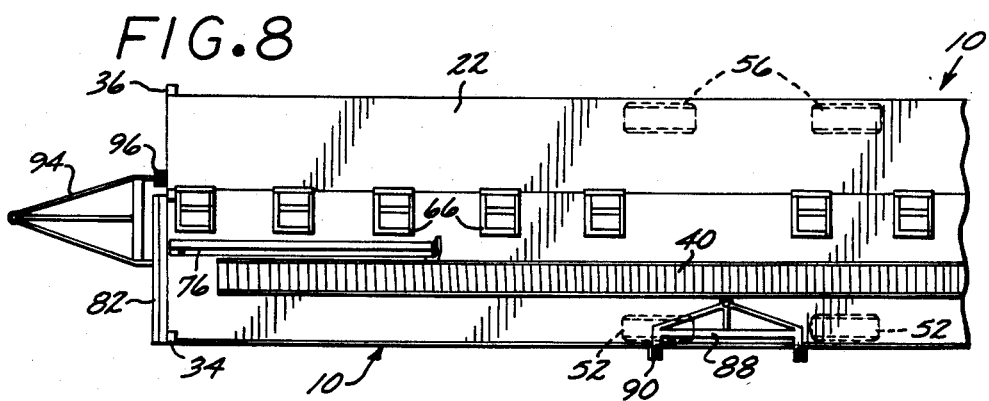

HARVESTING/PACKING SYSTEM

BACKGROUND OF THE INVENTION

1. Field of the Invention

The invention relates to methods and machinery for harvesting and packing low-growing row crops.

2. Description of the Prior Art

For the harvesting and packing of low-growing row crops many devices have been set forward generally involving complicated and expensive machinery such as power-driven conveyor belts and other mechanically-driven elements. The continuous work in this field indicates there is need for a device which can transverse a large number of crop rows, serve to bring the harvested produce to a central packing area, provide ample packing materials in the form of boxes, and provide for the sealing and subsequent off-loading of containers fully packed with harvested produce.

Jackson U.S Pat. No. 2,321,387, Morine U.S. Pat. No. 2,584,361 and Jones et al. U.S. Pat. No. 2,782,943 all provide for conveyor wings extending over a plurality of rows to be harvested. These conveyor wings however are mechanically driven and therefore require an elaboration of machinery, resulting in high purchase and maintenance costs as well as potential machine malfunctions. Even more complicated are U.S. Patents to Csimma U.S. Pat. No. 3,340,935, Button U.S. Pat. No. 3,390,768, Bettencourt et al. U.S. Pat. No. 3,986,561, Friedel et al. U.S. Pat. No. 4,033,099, and Turold et al. U.S. Pat. No. 4,262,477. These disclosed devices are intended specifically for harvesting, separating and sorting tomatoes and other vine crops, developing conveyor systems to avoid bruising the fruit. While this complexity may be in order for the art of tomato harvesting, it is excessive in many other types of harvesting. None of these patents adequately address the problem of packing the harvested produce. Although less complex, the devices disclosed in U.S. Patents to Chong U.S. Pat. No. 2,169,521, Jelderks U.S. Pat. No. 2,395,124, Maag U.S. Pat. No. 3,292,806, and Hood et al. U.S. Pat. No. 4,199,913 do not provide means for traversing a significant number of rows of low-growing crops, all involve conveyor systems, and provide no packaging means. Jarrett U.S. Pat. No. 3,503,196 has all of the above problems, does make casual reference to packaging, but does not elaborate on how that is to be accomplished. Davis U.S. Pat. No. 3,485,026 and Smith U.S. Pat. No. 3,981,127 do not address the problem of harvesting low-growing crops, nor do they address the problem of packaging harvested produce. Jackson U.S. Pat. No. 2,321,387 and Puch, Sr. et al. U.S. Pat. No. 3,968,842 do make reference to packaging harvested produce, but the device disclosed in U.S. Pat. No. 2,321,387 must be loaded with empty boxes first dumped on the field to be harvested, and U.S. Pat. No. 3,968,842 complicates packing by requiring that the produce be emptied from a loading box into a packing box, and does not provide for access to or construction of the empty packing boxes.

Applicant is aware of no harvesting/packing system or device which provides for manual loading of hand-picked produce directly onto a packing table or onto an inclined plane from which suitable harvested produce may roll onto a central packing area which provides for an assembly station of empty boxes to be packed with harvested produce or which provides for a simple, non-mechanized means of providing the moveable packing station with the assembled, empty boxes. No device has heretofore appeared which provides for the efficient harvesting and packaging of low-growing row crops such as melons, cauliflowers, lettuce, cabbage, and the like which is capable of rolling down an inclined plane.

SUMMARY OF THE INVENTION

In view of these and other problems in the art, it is a general object of the present invention to provide a moveable on-site harvesting/packing plant wherein the manual harvesting of produce, the manual assemblage of packing materials, and the manual packing and off-loading of harvested produce are efficiently intefaced.

It is another object of the present invention to provide a moveable plant of the character described wherein the manual processing of harvested produce from harvesting to packing may take place on-site in the field to be harvested as the plant described is being towed along the crop rows.

It is another object of the present invention to provide a harvesting/packing plant of the character described wherein the harvesting/packing plant comprises a frame to be towed along rows of crop to be harvested, that frame comprising a forward floor area and an elevated rearward table area, the harvested produce being placed on the table area by pickers following the moveable on-site harvesting packing plant as it is being towed along the rows of crop to be harvested.

Another object of the present invention is to provide a moveable harvesting/packing plant of the character described wherein the packing table is fitted with outboard inclined, transverse wings which extend out over rows of crop to be harvested, upon which harvested produce may be placed and from which harvested produce rolls down onto a central packing table.

Another object of the present invention is to provide a moveable harvesting/packing plant of the character described wherein packers standing on the floor area of the plant take the produce placed on the table area by the pickers and pack the produce into boxes.

Yet another object of the present invention is to provide a moveable harvesting/packing plant of the character described wherein the harvesting/packing plant extends transversely over a number of rows of crop to be harvested so as to require fewer passes back and forth through the harvest site.

A further object of the present invention is to provide a moveable harvesting/packing plant of the character described which provides for an onboard box assembly station wherein a box assembler may take a flattened carton from a stack, assemble it into a box, and place it within access of packers in a central packing station.

Yet another object of the present invention is to provide a moveable harvesting/packing plant of the character described wherein assembled boxes are moved from an onboard box assembly station to a central packing station by means of sliding them along a transversely extending box rack elevated above the packing table in front of the packers and which may be fed from either end by the box assemblers.

A further object of the present invention is to provide a moveable harvesting/packing plant of the character described wherein boxes filled with harvested produce may be transported by gravity feed from the packing station to a centrally-located sealing station, where a box sealer seals the filled boxes and then off-loads them by means of a gravity feed roller belt.

It is a further object of the present invention to provide a moveable harvesting/packing plant of the character described wherein no mechanically driven machinery is required in order to coordinate the harvesting and packing of low-growing row crop produce.

A still further object of the present invention is to provide a moveable harvesting/packing plant of the character described wherein the harvesting packing plant may be folded and packed up and then towed in orientation transverse to its harvesting travel.

Another object of the present invention is to provide a harvesting/packing system of the character described wherein the wheels supporting the moveable plant may be fixed in either a harvesting or between-site towing orientation.

A framework comprising a floor and table area is elevated above and extends transversely over a plurality of rows of low-growing produce to be harvested and may be towed along these rows. The table area is to the rear of the framework, and pickers following the towed framework place harvested produce onto the table which serves as a packing table. Extending transverse to the direction of travel outboard from the packing table are two inclined loading wings suspended at an angle such that harvested produce placed on these wings will roll down onto the central packing table. Outboard of the central floor area are box assembly stations where box assemblers construct boxes from a stack of flattened cartons and slide them along an overhead box rack extending above and along the length of the packing table. A number of angle iron box supports hang at the front of the packing table with a packer standing at each. The packers take the assembled, empty boxes from the overhead box rack, place them in the angle iron box supports, and fill the empty boxes with the produce which has been placed on the packing table by the pickers. Once the boxes have been filled, they are placed on a V-shaped roller belt which extends along the length of the floor area and is elevated to an optimal work height, the filled boxes then feeding into the center of the V-shaped roller belt where a sealer seals the filled boxes and off-loads them by means of another gravity feed roller belt to ground level.

BRIEF DESCRIPTION OF THE DRAWINGS

These and other objects of the invention will become more apparent in view of the following description taken in conjunction with the drawings, wherein:

FIG. 1 is a view in elevation from the front of the moveable harvesting packing plant of the present invention as it is being towed along crop rows to be harvested.

FIG. 2 is a cross-sectional view with portions in elevation taken on line 2—2 in FIG. 1, also showing the orientation of workers with respect to the moveable harvesting packing plant of the present invention.

FIG. 3 is a cross-sectional view with portions in elevation taken on line 3—3 in FIG. 1.

FIG. 4 is a cross-sectional view with portions in elevation taken on line 4—4 in FIG. 3.

FIG. 5 is a cross-sectional view with portions in elevation taken on line 5—5 in FIG. 2.

FIG. 6 is a cross-sectional view with portions in elevation taken on line 6—6 in FIG. 2.

FIG. 7 is a view in elevation taken on line 7—7 in FIG. 2.

FIG. 8 is a view from above in elevation of the moveable harvesting packing plant of the present invention as it is packed up to be towed between harvest sites.

DETAILED DESCRIPTION

Referring to the drawings and at first particularly to FIGS. 1-3, the harvesting/packing system of the present invention comprises a moveable on-sight harvesting/packing plant generally designated 10 which is elevated above and extends transversely over a number of crop rows 12. The moveable on-site harvesting/packing plant 10 is towed along these rows as produce is harvested and packed. The primary structural element of the moveable on-site harvesting packing plant 10 is a frame 14 comprising a lower front section and a higher rear section. The lower front section of the frame 14 is a floor frame 16 supporting a floor 18, which is elevated above the crop rows 12 such that both the floor frame 16 and floor 18 clear the crop rows 12 and the produce to be harvested. Attached to and partially supported by the floor frame 16 is a table frame 20. The table frame 20 is to the rear of and higher than the floor frame 16 and supports a table 22 which is substantially flat and horizontal. Extending from the table frame 20 above the level of the table 22 is a front retaining flange 24 and a rear retaining flange 26. These retaining flanges 24 and 26 serve to keep harvested produce on the table 22. The table frame 20 is attached to and partially supported by the floor frame 16 by means of table supports 28. The table supports 28 comprise vertical beams 30 and angle beams 32, as illustrated in FIG. 3.

Terms such as front and back or rear refer to the travel of the moveable on-site harvesting/packing plant 10 as it is towed along the crop rows 12 to be harvested with the harvesting packing plant 10 extending transversely across these crop rows 12. It is to be understood that these and other terms of orientation and dimensionality are herein used in order to facilitate and clarify the present description and are not meant by way of limitation.

Also shown in FIGS. 1-3 are vertical awning supports 34 and 36. As shown in FIG. 3, the front vertical awning supports 34 are attached to the front of the floor frame 16, while the rear vertical awning supports 36 are attached to the rear of the table frame 20. The front vertical awnings supports 34 and rear vertical awning supports 36 reach to a substantially equal elevation. Strung between the front vertical awning supports 34 is awning support cable 38, as illustrated in FIG. 1. FIG. 3 shows awning support cable 38 strung between the respective pairs of front vertical awning supports 34 and rear vertical awning supports 38. The awning supports 34 and 36, in conjunction with the awning support cable 38, support a removable awning, not shown in the accompanying drawings in order to facilitate illustration of the remainder of the moveable on-site harvesting/packing plant 10. When in place this awning serves to protect the workers at their stations aboard the moveable on-site harvesting/packing plant 10.

A V-shaped transverse boxing roller belt 40, best shown in FIGS. 2 and 3, sits on the floor 18 elevated to an optimal working level by legs 41. The shallow V shape of the boxing roller belt 40 allows boxes to be sealed to roll toward the center of the boxing roller belt 40. Proximate the center of the boxing roller belt 40 is a table-to-ground off-loading roller belt 42, by means of which boxes may be delivered to ground level from the level of the transverse boxing roller belt 40.

An overhead box rack 44 is shown in FIGS. 1 and 3. This box rack 44 is meant to hold assembled empty boxes before they are packed with harvested produce. The overhead box rack 44 comprises a transverse box corridor 46 supported above the level of the table 20 at an angle in order to facilitate placement and access by vertical supports 48 and angle braces 50 attached to the vertical beams 30 of the table supports 28. This construction is best seen in FIG. 3.

The entire frame 14 of the harvesting/packing plant 10 is supported by a wheel assembly 51, shown in FIGS. 1, 3 and 4. Beneath the floor frame 16 are the front wheels 52, which are attached to the floor frame 16 by pivotally-mounted wheel brackets 54 to allow these front wheels 52 to adjust to the towing direction of the harvesting packing plant 10. The frame 14 is supported in the rear beneath the table frame 20 by the rear wheels 56. Since the table frame 20 is higher than the floor frame 16, the rear wheels 56 are attached to extended vertical wheel arms 58. These wheel arms 58 are in turn attached to the angle braces 32 of the table supports 28 by means of rear wheel braces 60. The connection between the extended wheel arms 58 and the rear wheel braces 60 comprises a two-position swivel mount 62, illustrated most clearly in FIG. 4 A locking nut and bolt assembly 64 fixes the extended rear wheel arms 58 in either of two orthogonally related positions to the rear wheel braces 60 locking the rear wheels 56 either in parallel with the crop rows 12 or in parallel with the longitudinal extent of the harvesting/packing plant 10.

FIGS. 1, 2 and 5 illustrate angle iron box supports 66, which are detachably mounted to the front of the table 22. Depending on the amount to be harvested, varying numbers of these angle iron box supports 66 may be utilized. The attachment between the angle iron box supports 66 and the front of the table 22 consists of an angle iron flange hook 68, which is part of the top of the angle iron box support 66. This angle iron flange hook 68 hooks over the front retaining flange 64 of the table 22. Thus, each angle iron box support 66 may be slid along the front retaining flange 24 of the table 22 to a desired packing position. The angle iron box supports 66 support the boxes to be packed at an angle, as best seen in FIG. 1, with the top of the boxes proximate the level of the table 22 so as to minimize the amount of arm work required to pack a box of harvested produce.

Extending from the lateral extremes of the table 22 are inclined transverse wings 70, which in fact form a part of the table 22. Harvested produce placed on these inclined transverse wings 70 rolls down the wings 70 and onto the central table 22 for packing. At the front and back of the inclined transverse wings 70 are retaining flanges 72 designed to serve the same retaining purpose as the flanges 24 and 26 on the table 22. The inclined transverse wings 70 are hooked onto the table 22 by means of detachable angle iron mounts 74. These angle iron mounts 74 comprise the mating of a downwardly-facing angle iron flange hook 76 on the longitudinally interior end of the inclined transverse wings 70 with the upwardly-facing angle iron lips 78 attached to the longitudinal extremes of the central table 22, as illustrated in FIG. 5. The inclined transverse wings 70 are held in the desired angle relative to the table 22 by means of wing support cables or chains 80, which extend from the longitudinal extreme of the transverse wings 70 to the top of the rear vertical awning supports 36.

In front of the transverse wings 70, attached to the floor frame 16 at the same level as the floor 18, are horizontal boxing platforms 82 attached to the floor frame 16 by means of a platform hinge 84. These areas are utilized for the construction of boxes to be filled with harvested produce and are maintained during use at the same level as the floor 18 by means of boxing platform suspension cables or chains 86.

Best illustrated in FIG. 2 is the on-site tow bar frame assembly 88. This on-site tow bar frame 88 is attached to the floor frame 16 by means of a tow bar hinge 90, and is meant to be attached to a tractor towing attachment 92, by means of which a tractor may tow the moveable on-site harvesting/packing plant 10 along the crop rows 12 to be harvested. While FIGS. 1-7 show the configuration of the various elements of the moveable on-site harvesting/packing plant 10 when in use during harvesting and packing in the fields, FIG. 8 shows the harvesting/packing plant 10 as it is packed up to be moved between harvesting sites. An off-site tow bar frame assembly 94 has been attached to one end of the harvesting/packing plant 10 by means of a detachable hinge assembly 96. This detachable hinge assembly 96 allows the harvesting/packing plant 10 to be attached to a tractor truck or other road-worthy vehicle and drawn as a trailer to the next harvest site. Also shown in FIG. 8 are the front wheels 52 and rear wheels 56 in position to be towed along a road or highway between harvest sites. The rear wheels 56 have been locked by means of the two-position swivel mounts 62 and the nut and bolt assembly 64 in a direction parallel to the longitudinal extent of the harvesting packing plant 10. The front wheels 52 have swung into that position by towing. The transverse wings 70 have been disengaged from the angle iron lips 78 at the longitudinal extremes of the table frame 20 and placed on the floor 18 of the harvesting/packing plant 10, while the horizontal boxing platforms 82 and the on-site tow bar frame assembly 88 have been swung up into a vertical position for between-site towing.

FIG. 2 best illustrates the operation of the moveable on-site harvesting/packing plant 10 in coordination with human labor. Once the structural elements of the moveable on-site harvesting/packing plant 10 are understood, the harvesting/packing plant 10 may be easily divided into operational stations. The harvesting and packing of produce according to the present invention may be flow charted as follows. A picking station 98 is defined by pickers 99 following the moveable on-site harvesting/packing plant 10 as it moves along the crop rows 12 which are to be harvested, gathering produce and placing it either on the table 22 or on the inclined transverse wings 70, from which the produce rolls onto the table 22. A box construction station 100 is located on the horizontal boxing platforms 82, whereon a box assembler 101 accesses a stack of flat boxes 102, assembles them, and places the assembled boxes 103 on the overhead box rack 44, as best seen in FIGS. 1 and 3. As the box assembler 101 places the assembled boxes 103 on the overhead box rack 44, the assembled boxes 103 slide along the transverse box corridor 46 to a point where they may be easily accessed at the packing station 104. The packing station 104 is defined by a number of packers 105 standing on the floor 18 of the harvesting/packing plant 10 proximate the table 22 next to an angle iron box support 66. The packers 105 take assembled boxes 103 from the overhead box rack 44, place the assembled boxes 103 in their corresponding angle iron box supports 66, and proceed to fill the assembled box 103 with harvested produce. Once the assembled boxes 103 have been filled by the packers 105, the packers 105 place them on the V-shaped transverse boxing roller belt 40. The filled, assembled boxes 103 then roll down the V-shaped transverse boxing roller belt 40 to the sealing station 106, where a sealer 107 takes the assembled boxes 103 filled with produce, seals them, and then places the sealed boxes 108 on the table-to-ground off-loading roller belt 42. Harvesting and packing are then complete, and the sealed boxes 108 may be picked up by a truck to be taken to a central warehouse.

The harvesting/packing system of the present invention provides a simple, towable, moveable on-site harvesting/packing plant 10, by means of which with a minimum of portage and consequent damage to harvested produce such produce may be packaged at the harvesting sight. A large number of crop rows may be harvested at once, owing to the transverse extent of the harvesting/packing plant 10 over the crop rows 12 and may be continuously harvested without having workers either drop overloaded bags of produce in the field or stop harvesting to transport harvested produce to a central packing area. The harvesting/packing plant 10 of the present invention may be easily closed and packed up in order to move the plant 10 from one harvesting site to another. The harvesting/packing plant 10 of the present invention provides for four on-site work stations: a picking station 98, a box construction station 100, a packing station 104, and a sealing station 106. Harvested produce may be processed through all four stations with a minimum of damage to the produce.

While the present invention has been described with reference to a presently preferred embodiment, it is to be understood that various modifications may be made by those skilled in the art without departing from the scope and spirit of the invention as set forth in the appended claims.

I claim:

1. For the harvesting and packing or produce grown in low rows, a moveable on-site harvesting/packing plant comprising:
   a frame elevated above and transversely extensive over said crop rows and moveable along said rows,
   said frame supporting a floor area and table area elevated relative to said floor area,
   said frame defining discrete work stations of said plant, said work stations comprising a picking station, a station for the assembly of packing boxes, and a packing station,
   said picking station comprising said table area and a pair of inclined transverse wings extending laterally outwardly and upwardly from opposite sides of said table area, whereby pickers walking along with said plant as it is being moved along said crop rows may place harvested produce on said table area and on said wings, and such produce placed on said wings will roll down said wings onto said table area owing to the incline of said wings.

2. A moveable on-site harvesting/packing plant as defined in claim 1 wherein said plant is moveable along said rows by towing means.

3. A moveable on-site harvesting/packing plant as defined in claim 1 wherein said plant is supported by front and rear wheel assemblies.

4. A harvesting/packing plant as defined in claim 3 wherein said wheels may be oriented transversely to the direction of harvesting travel for movement of said plant between harvesting sites as a trailer by towing means.

5. A harvesting/packing plant as defined in claim 1 wherein said work stations include a box sealing station.

6. A harvesting/packing plant as defined in claim 5 wherein a gravity feed roller belt stands on said floor area such that packed boxes may be placed on said roller belt and fed to said sealing station where said packed boxes are sealed.

7. A harvesting/packing plant as defined in claim 1 wherein said table area comprises the rear of said frame when said plant is being moved along said rows.

8. A harvesting/packing plant as defined in claim 1 wherein an off-loading gravity feed roller belt extends from the level of said floor area to ground level such that boxes packed with said produce may be placed on said off-loading roller belt and deposited on the ground without stopping the progress of said plant along said crop rows.

9. A harvesting/packing plant as defined in claim 1 wherein substantially horizontal box assembly platforms extend transversely outboard from said floor area.

10. A harvesting/packing plant as defined in claim 9 wherein an overhead box rack extends above and along said table area holding assembled, empty boxes until they are needed to pack said harvested produce.

11. A harvesting/packing plant as defined in claim 1 wherein said wings are detachably mounted to the longitudinal extremes of said table.

12. A harvesting/packing plant as defined in claim 11 wherein said wings may be detached from said table area and loaded onto said plant for between-site travel.

13. A harvesting/packing plant as defined in claim 1 wherein said wings are held in a fixed incline by suspension means.

14. A harvesting/packing plant as defined in claim 10 wherein said overhead box rack comprises a box corridor slide along which assembled, empty boxes may slide in order to facilitate access to said empty boxes when they are required for packing.

15. A harvesting/packing plant as defined in claim 9 wherein said box assembly platforms define said box assembly stations.

16. A harvesting packing plant as defined in claim 15 wherein a box assembler stands on said box assembly platform during harvesting and constructs packing boxes from flat cartons as needed in order to pack said harvested produce.

17. A harvesting/packing plant as defined in claim 9 wherein said box assembly platforms are attached to said floor area by hinge means.

18. A harvesting/packing plant as defined in claim 17 wherein said box assembly platforms may be folded up by said hinge means in order to facilitate between-site travel of said harvesting/packing plant.

19. A harvesting/packing plant as defined in claim 9 wherein said box assembly platforms are held substantially horizontal by suspension means.

20. A harvesting/packing plant as defined in claim 1 wherein said packing station is defined by packers standing on said floor area taking harvested produce from said table area and packing said harvested produce into empty boxes.

21. A harvesting/packing plant as defined in claim 20 wherein said empty boxes are placed in box supports depending from said table area in order to facilitate the packing of said boxes.

22. A harvesting/packing plant as defined in claim 21 wherein said box supports depend from said table area such that the tops of said boxes are substantially level with said table during packing.

23. A harvesting/packing plant as defined in claim 21 wherein said box supports are detachably mounted on said table.

24. A harvesting/packing plant as defined in claim 21 wherein said box supports are slideably mounted on said table.

25. A harvesting/packing plant as defined in claim 14 wherein said overhead box rack may be fed with said empty boxes from the extremes of said box rack, said boxes sliding along said box rack as more of said empty boxes are fed onto said box rack.

26. A harvesting/packing plant as defined in claim 25 wherein said empty boxes are fed onto said overhead box rack from box assembly stations located proximate the extremes of said overhead box rack.

* * * * *